US 8,060,085 B2

(12) United States Patent
Goulder et al.

(10) Patent No.: US 8,060,085 B2
(45) Date of Patent: Nov. 15, 2011

(54) SYSTEM AND METHOD FOR COMMUNICATING LOCATION INFORMATION

(75) Inventors: Jordan Wayne Goulder, Lynchburg, VA (US); David Fulton Mears, Amherst, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 1086 days.

(21) Appl. No.: 11/810,029

(22) Filed: Jun. 4, 2007

(65) Prior Publication Data

US 2008/0299942 A1    Dec. 4, 2008

(51) Int. Cl.
*H04W 4/00* (2009.01)
(52) U.S. Cl. ............... 455/432.2; 455/435.1; 455/435.2; 455/435.3; 455/432.1; 455/432.3
(58) Field of Classification Search ............... 455/456.1, 455/404.2, 414.1, 440, 441, 432.1, 432.2, 455/432.3, 435.1, 435.2, 435.3; 340/988, 340/989, 990
See application file for complete search history.

(56) References Cited

U.S. PATENT DOCUMENTS

| 4,706,689 A * | 11/1987 | Man ......................... 455/456.1 |
| 6,298,229 B1 | 10/2001 | Tomlinson, Jr. et al. |
| 6,321,158 B1 | 11/2001 | DeLorme et al. |
| 6,492,941 B1 | 12/2002 | Beason et al. |
| 6,765,528 B2 | 7/2004 | Tranchina et al. |
| 6,871,144 B1 | 3/2005 | Lee |
| 7,091,852 B2 | 8/2006 | Mason et al. |
| 2005/0068169 A1* | 3/2005 | Copley et al. .............. 455/456.1 |
| 2005/0243784 A1* | 11/2005 | Fitzgerald et al. ............ 370/338 |

* cited by examiner

*Primary Examiner* — Kamran Afshar
*Assistant Examiner* — Manpreet Matharu
(74) *Attorney, Agent, or Firm* — Fox Rothschild, LLP; Robert J. Sacco (57) ABSTRACT

A system and method for communicating location information are provided. The method includes transmitting location information from the radio unit based on a first sample rate when the radio unit is operating in a normal tracking mode. The method further includes storing location information in the radio unit based on a second sample rate upon detection by the radio unit of a triggering event.

20 Claims, 6 Drawing Sheets

```
RADIO ESN 48A7B258                              <<unique serial number for this radio>>
SYSTEM 5 LID 1856                               <<radio is using system 5, user LID is 1856>>
6/13/06,13:29:54,3719.60,N,07912.00,W,47,78     <<location at 1:29 PM speed = 47MPH, heading = 78 degrees>>
6/13/06,13:34:37,3719.75,N,07912.48,W,21,145    <<location at 1:34 PM speed = 21MPH, heading = 78 degrees>>
6/13/06,13:38:45,RG0775,1902                    <<1:38 PM RX group call on GID 775 from unit 1902>>
6/13/06,13:39:01,TG0775                         <<1:39 PM TX group call on GID 775>>
6/13/06,13:39:37,3719.25,N,07912.18,W,5,115     <<location at 1:39 PM speed = 5MPH, heading = 115 degrees>>
6/13/06,13:45:17,TE0775                         <<1:45 PM TX emergency on GID 775>>
6/123/06,13:45:25,RG0775,1907                   <<1:45 PM TX group call on GID 775, 775 from unit 1907>>
6/13/06,13:45:37,RG0775,1825                    <<1:45 PM RX group call on GID 775, 775 from unit 1825>>
6/13/06,13:45:53,TG0775                         <<1:45 PM TX group call on GID 775>>
6/13/06,13:46:01,RG0775,302                     <<1:46 PM RX group call on GID 775775 from unit 302>>
6/13/06,13:47:05,3719.60,N,07912.00,W,0,130     <<location at 1:47 PM speed = 0MPH, heading = 130 degrees>>
6/13/06,13:48:12,3719.75,N,07912.48,W,0,130     <<location at 1:48 PM speed = 0MPH, heading = 130 degrees>>
6/13/06,13:49:04,3719.60,N,07912.00,W,0,130     <<location at 1:49 PM speed = 0MPH, heading = 130 degrees>>
6/13/06,13:49:53,TEC0775                        <<1:49 PM TX emergency cleared on GID 775>>
```

SYSTEM AND METHOD FOR COMMUNICATING LOCATION INFORMATION

BACKGROUND OF THE INVENTION

This invention relates generally to wireless communication systems, and more particularly, to communicating location information with wireless communication systems, especially using a public safety band for transmissions.

Public safety communications are provided over specified communication frequencies. Public safety transmissions may be provided using, for example, a land mobile radio (LMR), which may be used to transmit public safety communications between different mobile units, for example, different LMRs. Land mobile radio band communication including public safety radio communication (e.g., police, fire department, etc.) is generally available within the VHF, UHF, 700 MHz and 800 MHz frequency bands. Part of each of these frequency bands is allocated by the Federal Communications Commission (FCC) for public safety communication services and is also referred to as Public Safety Frequency Bands. These public safety communications also may be provided using private land mobile radio services (PLMRS).

The radios communicating the public safety transmission may use different communication protocols or standards when transmitting. For example, an LMR standard such as Project 25 or Terrestrial Trunked Radio (TETRA) communication standard may be used to communicate public safety transmissions. These radios also may have the capability to communicate other information. For example, these radios may be equipped or have the option to add on a Global Positioning System (GPS) receiver or module. The GPS enabled radio is then able to transmit position information regarding the location of the radio and provides a tracking feature. However, adding a tracking system (with a GPS unit) often requires expansion of the communication system to handle the increased data from the GPS transmissions. Thus, added controls are needed to balance the radio network loading while trying to accurately track the radios. In some circumstances, for example, where a large number of radios are in the same geographic area and communicating using the same communication site, the voice data communication in addition to the location information transmission can overload the system and cause communications to fail.

Known systems attempt to balance the transmission of voice and data, including position updates, by transmitting position updates (e.g., a short position message) at a slow rate. For example, position updates are communicated every fifteen minutes or every thirty minutes and then may be displayed at a dispatch center. However, this information provides coarse location information that may be inaccurate depending on the movement of the radio. For example, if a high speed chase is in progress, location information communicated even at one minute intervals can be inaccurate.

Thus, these known radios and systems that provide communication and location information often require additional controls for managing the location information data transmissions. These added controls add cost and complexity to the system. Additionally, the location information is often coarse and may even be inaccurate as a result of the time between location transmissions.

BRIEF DESCRIPTION OF THE INVENTION

In an exemplary embodiment, a method for communicating location information for a radio unit is provided. The method includes transmitting location information from the radio unit based on a first sample rate when the radio unit is operating in a normal tracking mode. The method further includes storing location information in the radio unit based on a second sample rate upon detection by the radio unit of a triggering event.

In another exemplary embodiment, a method for tracking a radio unit is provided. The method includes using a normal tracking mode to acquire location information for the radio unit and periodically transmitting the location information from the radio unit. The method further includes using an emergency tracking mode to acquire location information from the radio unit upon detection of a triggering event and storing the acquired location information acquired during the emergency tracking mode in the radio unit. The method also includes transferring the stored location information.

In yet another exemplary embodiment, a radio unit is provided that includes a location receiver configured to determine location information and a transmitter configured to periodically transmit acquired location information in a first tracking mode. The radio unit further includes a memory configured to store acquired location information in connection with radio operation information in a second tracking mode. The radio operation information includes one of a timestamp, a speed indication and a direction indication.

BRIEF DESCRIPTION OF THE DRAWINGS

FIG. 7 is a diagram illustrating a tracklog of location information acquired in accordance with various embodiments of the invention.

DETAILED DESCRIPTION OF THE INVENTION

Various embodiments of the invention provide a system for communicating location information (and corresponding radio operation information) using radio units that may be configured to transmit over public safety frequency bands. The location information in the various embodiments includes, for example, Global Positioning System (GPS) location information and the corresponding radio operation information includes information regarding the operation of the radio unit (e.g., speed and direction of travel of the radio unit).

Although the various embodiments may be described in connection with a particular radio unit, communication system or communication protocol, the various embodiments may be implemented in connection with different radio units communicating using different systems or protocols. For example, the radio unit may be any kind of radio capable of transmitting wirelessly, for example, transmitting over the Public Safety Frequency Bands within the VHF, UHF, 700 MHz and 800 MHz frequencies. Additionally, different communication protocols may be used, for example, one of a Project 25 (TIA 102) or an ETSI TETRA standard or a proprietary format such as an OpenSky M/A-COM proprietary format, a NetworkFirst or EDACS system proprietary format.

Figure 1:
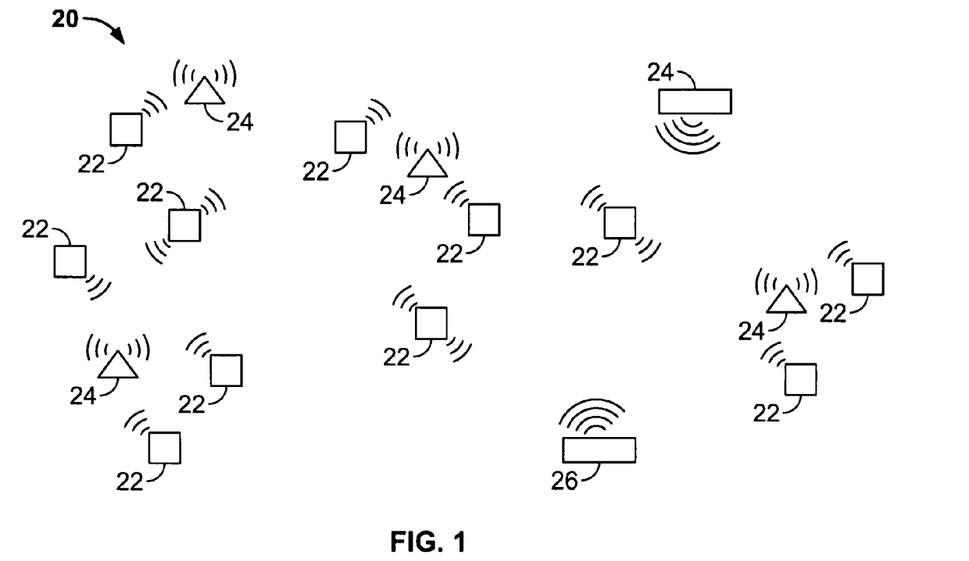
FIG. 1 is a block diagram of a wireless communication system in connection with which various embodiments of the invention may be implemented.

As shown in FIG. 1, an exemplary wireless communication system 20, for example, an LMR communication system provides communication between a plurality of radio units 22 (e.g., LMR radio units or terminals) that may be configured for mobile operation, such as carried by a person or located in various vehicles. For example, the radio units 22 may be portable/handheld units that may be carried by a person or mobile units that are mounted within a vehicle. However, the radio units 22 also may be fixed units including dispatch units 26, such as dispatch consoles located at a fixed location, for example, at a central communication facility to manage emergency communications. Within a communication coverage area, Radio Frequency (RF) coverage is provided by each of a plurality of communication sites, for example, base stations 24. The RF coverage may overlap. Additionally, the radio units 22 may communicate directly with each other, with a group of radio units 22 or with the dispatch units 26. The radio units 22 may subscribe to or be registered with one or more workgroups or talk groups such that the radio units 22 receive communications from different groups or sub-groups of other radio units 22, respectively.

The information communicated between the radio units 22 as well as to and from the dispatch units 26 includes both voice and data communications. For example, if the radio units 22 are LMRs, the voice communications may include, but are not limited to, voice transmissions within a police department group or a fire department group. The data communications may include, but are not limited to, location information, radio operation information, radio event information, emergency signal data, control data relating to selecting a particular talk group, LMR data for transfer between a radio unit and a server, reprogramming data (e.g., software upgrade data), etc.

Figure 2:
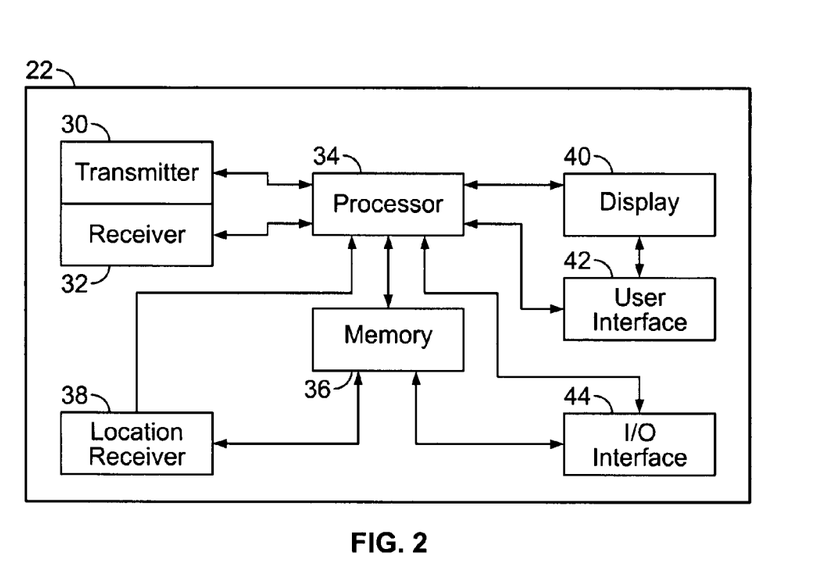
FIG. 2 is a block diagram of a radio unit constructed in accordance with various embodiments of the invention.

The radio unit 22 in an exemplary embodiment as shown in FIG. 2 includes a transmitter 30 and a receiver 32, which may be provided separately or as a single unit, for example, as a transceiver. The transmitter 30 and receiver 32 are connected to a processor 34, which is also connected to a memory 36 and a location receiver 38 (e.g., GPS receiver or a location sensing device). A display 40 is also connected to the processor 34 and to a user interface 42. An input/output (I/O) interface 44 is connected to the processor 34 and the memory 36.

The display 40 may be any type of display capable of display text and/or graphics with the user interface 42 including user depressible buttons for entering information or requests. The memory 36 may include one or more portions of non-volatile memory and also may be configured to be removed from the radio unit 22 (e.g., a memory module or flash memory). The memory 36 also may include other types of memory components or portions such as Random Access Memory (RAM) and/or Read Only Memory (ROM) and which may be configured to store different types of information. The I/O interface 44 may be any type of interface or port that allows data to be transferred into and out of the radio unit 22. For example, the I/O interface 44 may be a serial port or Universal Serial Bus (USB) port.

Figure 3:
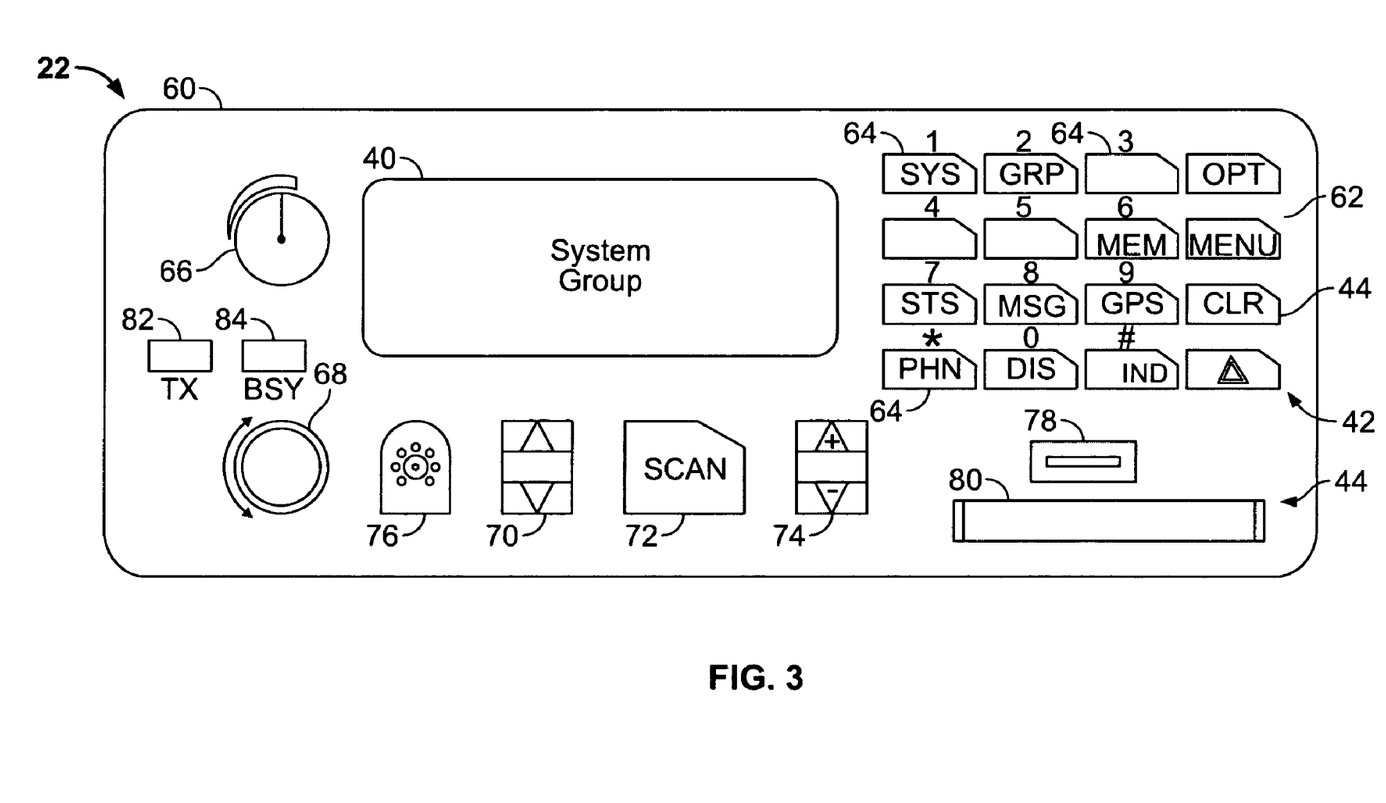
FIG. 3 is an elevation view of a front panel of a radio unit constructed in accordance with various embodiments of the invention.

The radio unit 22 may be a mobile unit as illustrated in FIG. 3. The radio unit 22 in the illustrated embodiment includes a front panel 60 having the display 40 (e.g., vacuum florescent display or LCD display) and the user interface 42. The user interface 42 includes a plurality of operating controls. For example, a keypad 62 may be provided for manual number entry by a user for individual calls and/or to activate or access functions or features of the radio unit 22. For example, buttons 64 of the keypad 62 may have associated numbers and/or functions that are activated by depressing the corresponding button 64, such as, to enter numbers, to access to a telephone interconnect system (PHN button) and to activate various EDACS, P25 Trunked or conventional features such as a menu selection (MENU button). One button 64 of note is the emergency button (illustrated having one triangle within another triangle) and is used to declare emergencies and initiate location tracking according to various embodiments of the invention as described in more detail below. Another button 64 of note is the GPS button that activates a GPS enabled radio unit 22 to transmit location information (and/or tracking information) as described in more detail below.

Other operable components are also provided as part of the user interface 42, for example, a power/volume control 66 (illustrated as a knob) to turn the radio unit 22 on and off, as well as controlling a volume level. A system/group/channel control 68 (illustrated as a knob) is used to select a system or group channel for communication. A ramp control 70 (illustrated as a button) is used to scan through a list of systems or groups/channels. The ramp control 70 also may be used, for example, to increment or decrement items within a list (e.g., a phone list). A scan on/off control 72 (illustrated as a rocker type button) is used to toggle on and off a scan operation wherein all groups and channel in a scan list, for example, in a currently selected system, are scanned. An add/delete control 74 (illustrated as a button) is used to add or delete groups/channels from a list or alternatively to provide incrementing and decrementing operation in a selectable list. Each of these controls may be activated by different input members and are not limited to the knobs and buttons shown. Also, the controls may be of a continuous type or multi-position type. Further, the controls may be configured to control different or alternate operations or functions, for example, different menu operations or radio functions.

Additionally, a microphone jack 76 may be provided to connect a microphone unit (not shown) thereto. The I/O interface 44 may include different connections that are optionally provided. For example, a hard-wire interface 78 and/or a removable memory interface 80 optionally may be provided. The hard-wire interface 78 is configured for connection to a wired communication link, for example, a serial communication cable or a USB communication cable. The removable memory interface 80 is configured to receive a removable memory device (e.g., flash memory or memory card/stick) therein. Each of the hard-wire interface 78 and the removable memory interface 80 may have an optional cover to conceal the connection portion of the interface until a connection is needed or desired.

Other indicators may be provided, for example, a transmitter enabled indicator 82 (illustrated as a light) that is on (e.g., light is on) when the radio unit 22 is transmitting and a busy indicator 84 (illustrated as a light) that is on (e.g., light is on) when data is being received (e.g., the channel is busy). Other input controls, interfaces, indicators, etc. may be provided, for example, based on the type of radio unit 22, the application for the radio unit 22, etc.

In operation, the radio unit 22 provides voice communications using a wireless network, for example, trunked radio communications. The communication of voice transmissions may be provided in any known manner, for example, using standard LMR communication techniques. However, the radio unit 22 may be configured for communication in different types of wireless systems, and in general in any wireless communication system, especially a wireless communication system communicating over a public safety band, private safety band or recreational communication band. The radio unit 22 also provides data communications using the wireless network. For example, if the radio unit 22 is GPS enabled and includes the location receiver 38 (shown in FIG. 2), the radio unit 22 periodically can be configured to transmit location information indicating the location of the radio unit 22. The location information is transmitted, for example, to a dispatch unit 26 that may be able to view the location of one or more of the radio units 22 based on the received location information. In a normal tracking mode, which is a low bandwidth mode, the location information is transmitted over longer time periods, for example, every ten minutes, every twenty minutes or every thirty minutes. Alternatively, a user may depress a button, for example, the GPS button 64 to enable GPS location detection of the radio unit 22 and then transmit the location information. In yet another alternative, a user at the dispatch unit 26 may interrogate the radio unit 22 to request the location information, which may activate the GPS functionality of the radio unit 22.

An emergency condition may be identified by sending an emergency signal from the radio unit 22 by depressing the emergency button 64. The emergency signal may transmit an audible sound (e.g., five beeps) and then may allow an emergency message to be broadcast (e.g., a preprogrammed emergency message or signaling sequence). Thereafter, a user will also be able to communicate voice transmissions. When an emergency condition is initiated, the radio unit 22 enters an emergency tracking mode as described in more detail below, such that location information is stored over shorter time periods, for example, every ten seconds, twenty seconds, thirty seconds, sixty seconds, etc. Additionally, corresponding radio information may be stored in connection with the location information and includes information regarding the operation of the radio unit (e.g., a timestamp, speed and direction of travel of the radio, etc.). It should be noted that the information stored during the emergency tracking mode may be accessed wirelessly, by a wired connection or through a memory device as described in more detail below. It also should be noted that the emergency tracking mode may be initiated by other inputs or conditions other than the depression of the emergency button 64. For example, the emergency tracking mode may be initiated by the dispatch unit 26 upon not receiving a response from a particular radio unit 22.

Figure 4:
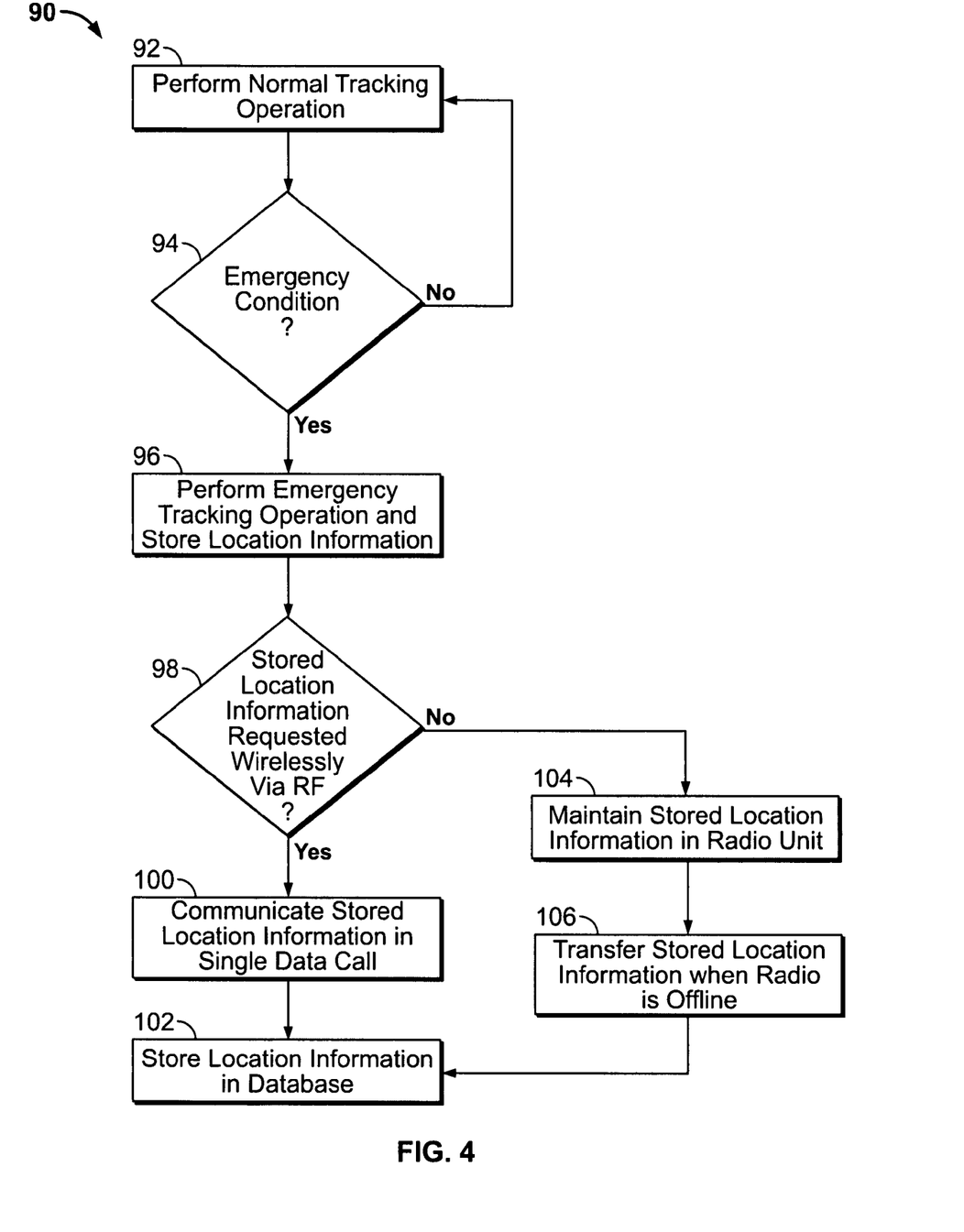
FIG. 4 is a flowchart of a method for communicating location information for a radio unit in accordance with various embodiments of the invention.
Figure 5:
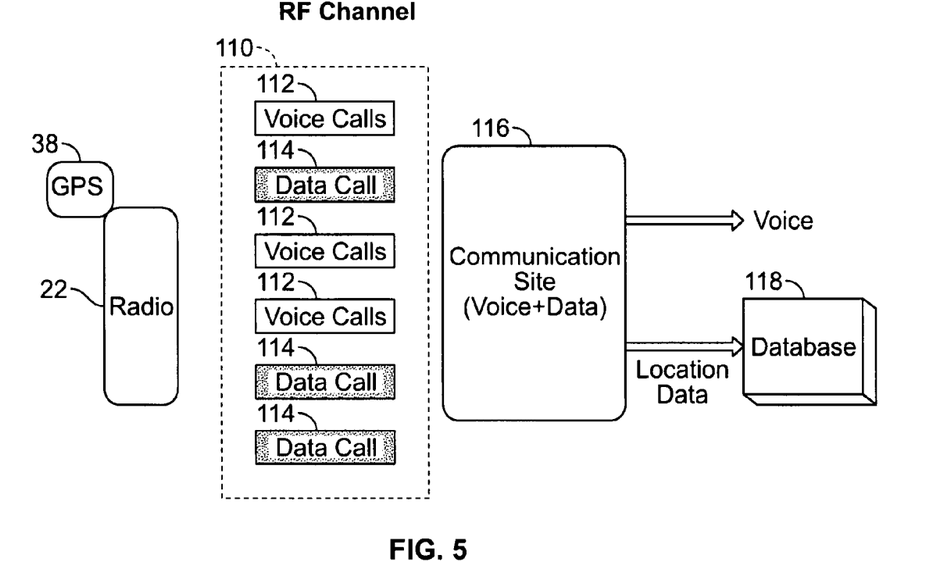
FIG. 5 is a block diagram illustrating the wireless transmission of location information in accordance with various embodiments of the invention during a normal mode of operation of a radio unit.

Various embodiments provide a method 90, shown in FIG. 4, for communicating tracking information, including location information, for a radio unit. The method 90 includes at 92 performing a normal tracking operation. This normal tracking operation includes transmitting location information over longer time periods (e.g., every ten minutes, every twenty minutes, every thirty minutes, etc.). The location information is communicated as data over an RF channel such that voice calls and data calls are mixed as shown in FIG. 5. Specifically, an RF channel 110 communicates voice calls 112 and data calls 114 over the same bandwidth. The voice calls 112 include voice communications between radio units 22 and the data calls 114 include communications of data from a mobile unit 22 to, for example, a dispatch unit 26 (shown in FIG. 1). The data calls can include the location information, but may also include other data information, such as emergency data information, status information, communication link information (e.g., frequency information, group identification information), etc.

The voice calls 112 and data calls 114 are communicated via a communication site 116, which may include, for example, the base station 24 (shown in FIG. 1). The communication site 116 communicates the voice calls 112 to one or more other radio units 22 and/or the dispatch unit 26. The communication site 116 also communicates the data calls 114 to one or more other radio units 22 and/or the dispatch unit 26. The voice calls 112 result in voice being output, for example, from a speaker of the radio unit 22 or the dispatch unit 26. The data calls 114 provide information to the other radio units 22 or the dispatch unit 26. For example, the data calls 114 may include an emergency signaling sequence or may include location information communicated to the other radio units 22 or the dispatch unit 26. The location information is optionally stored in a database 118 (e.g., historical location database) located in the dispatch unit 26. The location information may indicate the last known location of one or more radio units 22.

The method 90 then determines at 94 whether a triggering event has occurred, which in an exemplary embodiment is whether an emergency condition has been identified, for example, declared by the radio unit 22. For example, a user may depress an emergency button 64 (or another user input) on the radio unit 22. Alternatively, the dispatch unit 26 may issue an emergency condition with respect to a radio unit 22 if the radio unit 22 is not responding (e.g., if no responses are made to voice requests). It should be noted that an emergency condition refers to any condition that is not a normal operating condition. Alternatively, the condition may be an event for which more precise tracking is desired or required, for example, during a training exercise or when the user of the radio unit 22 is inexperienced (e.g., a new police officer). Thus, the initiating of the emergency condition may be configurable. Essentially, the event that triggers or starts the emergency condition is configurable. For example, some of the configuration options for the triggering may include, but are not limited to:

1. Radio button press initiated by radio user (e.g., Push-to-Talk (PTT) or emergency declared);
2. Dispatch data message;
3. Periodic interval; and
4. Auxiliary input (external signal).

However, other events may trigger the condition and that are not associated with a specific affirmative action. For example, an identified waypoint may trigger the emergency condition.

If a determination is made at 94 that an emergency condition does not exist then the normal tracking operation is performed at 92. However, if a determination is made at 94 that an emergency condition does exist then at 96 an emergency tracking operation is performed. More particularly, location information is acquired and stored at shorter time intervals, for example, every ten seconds, twenty seconds, thirty seconds, sixty seconds, etc. Specifically, the sample rate at which location information is acquired (and then stored) when an emergency condition exists is increased over the sample rate at which information is acquired (and optionally stored) when in the normal tracking mode. In particular, the sample rate is higher than during normal tracking operations. At each of these time points, location information and related radio information or events, that together define tracking information, is acquired and stored in the memory 36 of the radio unit 22. The information may be stored as a tracklog that includes a collection of data points stored internally in the memory 36 of the radio 22. The data points can include, for example, individual location waypoints and radio events (e.g., speed, direction of travel, nearby landmarks, etc.). Each data point may be time stamped such that the locations and events can be correlated. Further, the saving of individual data points in the tracklog is configurable. For example, the periodic interval is configurable such that the time interval between location waypoints will be configurable and can be dynamically changed. Also, a particular event may modify the existing periodic interval and allow, for example, more accurate data gathering from that point forward. Some of the ways the periodic interval may be initiated or modified include, but are not limited to:

1. Radio button press initiated by radio user;
2. Dispatch data message;
3. First press of emergency button;
4. Started on radio power-up; and
5. Auxiliary input (external signal).

The contents of individual data points in the tracklog also may be configurable, for example, to allow more or less information to be stored, such as based on the requirements for an individual application. For example, larger and more frequent tracking data messages provide more detailed information, but may be requested on a limited basis to prevent congesting the transmission channel. The active tracklog may be stored in a non-volatile memory, which may be a removable memory device. It should be noted that certain events can cause a snapshot of the tracklog to be stored in the non-volatile memory such that the information can be retrieved and, for example, audited at a later time. The radio unit 22 may store multiple snapshots in the non-volatile memory. The events that cause the tracklog to be saved to the non-volatile memory are configurable. Some of the configuration options may include, but are not limited to:

1. Radio button press initiated by radio user;
2. Dispatch data message;
3. First press of emergency button;
4. Radio power-down; and
5. Radio goes out of range.

It should be noted that the buttons that are used to select and/or initiate certain actions or configuration options may be different depending, for example, on the type of the radio unit 22 or the current mode in which the radio unit 22 is operated. Accordingly, a single button (e.g., emergency button) may function to initiate one action or configuration option. Optionally, the single button may function to initiate more than one action or configuration option, for example, based on an operating mode, user configuration, etc.

Figure 6:
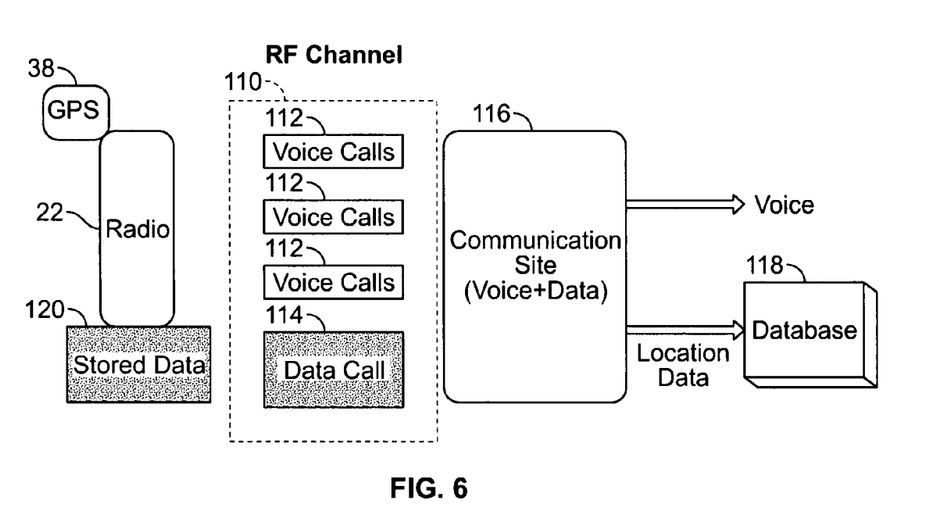
FIG. 6 is a block diagram illustrating the wireless transmission of stored location information of a radio unit in accordance with various embodiments of the invention after a triggering event.

Once the location information has been stored or a portion of the location information has been stored, then at 98 a determination is made as to whether the stored location information is being requested for transmission wirelessly, such as over the RF channel. For example, the dispatch unit 26 may interrogate the radio unit 22 (e.g., transmit a dispatch data message to the radio unit 22) requesting the stored location information, for example, requesting the transmission of a detailed tracking log over the RF channel. However, the stored location information may be requested by other actions, for example, a radio button depression (e.g., depression of a memory (MEM) button shown in FIG. 3) as initiated by a radio user or the radio unit returns to a system after the radio unit has been out of communication range. If the stored location information is requested wirelessly, then at 100 the stored location information is communicated wirelessly, for example, over an RF channel in a single data call and/or configured as a single data packet. The location information, which is the stored data 120, is communicated as data over the RF channel 110 as shown in FIG. 6, such that the data calls for communicating the location information are packaged into a single data call 114 (e.g., a single data packet) separate from the voice calls 112. The transmission of the stored location information in the data call 114 may be delayed if a determination is made that the communication channel is heavily loaded, for example, if a plurality of voice calls 112 are occupying the RF channel 110 and/or if the information is not, for example, urgently or immediately needed. Also, the request for wireless transmission of the location information may be made at any time.

It should be noted that the location information, for example, the tracklog data also contains information to identify the radio unit in which the tracklog data is stored and/or from which the data is communicated. For example, the logical identifier (LID) and/or electronic serial number (ESN) of the radio unit 22 may be provided in connection the stored and/or transmitted data. Further, the location information, including the tracklog data can be saved in a human readable format or in a compressed format and post processed externally, for example, for review and analysis. The location information when stored also may be stored in an encrypted or other protected format such that a password is needed in order to access the information.

Thereafter at 102 the transmitted location information is stored in the database 118 (shown in FIG. 6). The location information includes the tracklog for the radio unit 22, as well as other radio operation information such as time, speed, direction, etc. information. For example, the tracklog may be saved in a format as shown in FIG. 7 with an explanation for each entry provided in the brackets (<< >>). It should be noted that in this example, the position update interval changes from five minutes to one minute after the emergency is declared.

Figure 8:
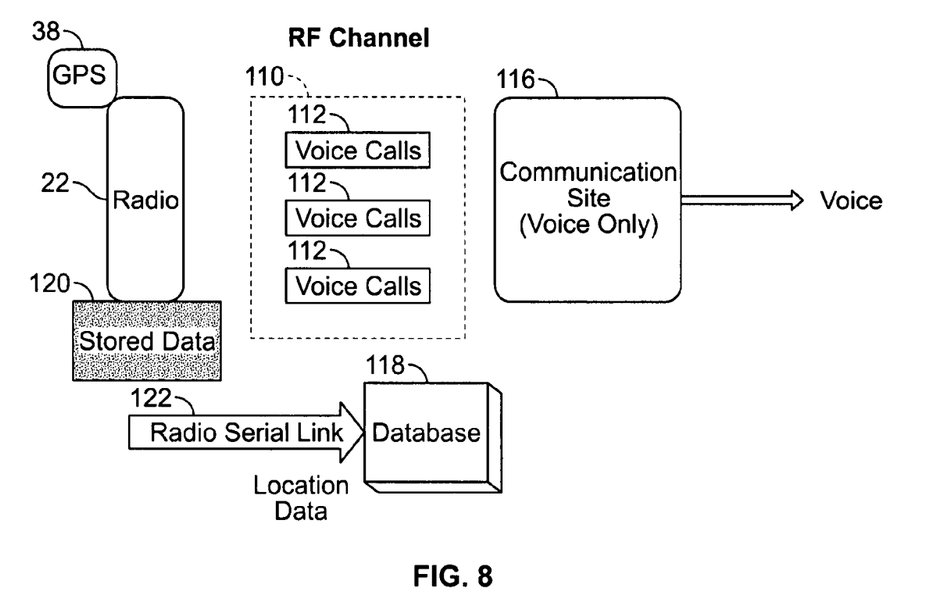
FIG. 8 is a block diagram illustrating the wired transmission of stored location information of a radio unit in accordance with various embodiments of the invention after a triggering event.

If a determination is made at 98 that the stored location information is not requested wirelessly, then at 104 the stored location information is maintained within the memory 36 of the radio unit 22. For example, the location information is maintained with a non-volatile memory area. This location information may be stored indefinitely or for a predetermined period of time (e.g., location information deleted after thirty days or sixty days). The oldest location information also may be deleted when the memory reaches capacity. With the stored location information maintained in the memory 36 of the radio unit 22, the location information can be accessed at a later time, for example, when the radio unit 22 is not operating and offline. Thus, the stored location information is transferred at 106 when the radio unit 22 does not have an RF communication link. For example, a police department may save the tracklog of each radio unit 22 at the end of each shift. The stored data 120, which includes the stored location information, is communicated via a non-wireless means as shown in FIG. 8. For example, the stored data 120 is communicated to the database 118 via a wired serial link 122, such as through a serial cable or USB cable connected to the hard-wire interface 78 (shown in FIG. 3). Alternatively, the stored data 120 may be stored on removable storage media and accessed through the removable memory interface 80 (shown in FIG. 3). For example, a flash memory or memory card may be removed from the radio unit 22 with the stored data 120 accessed and copied in any known manner. The location information is then stored in the database 118 at 102.

It should be noted that when the location information is communicated via a non-wireless connection, the RF channel 110, and more particularly, the bandwidth of the RF channel 110 is used to transmit voice calls 112. Periodically, limited location information may be communicated (during the normal tracking mode of operation) as shown in FIG. 5. Thus, the RF channel 110 may be fully dedicated to voice calls 112 with the location information retrieved offline. Also, the location information stored and transferred during the emergency tracking mode of operation may be more detailed (e.g., include more radio operation information) than during the normal tracking mode of operation.

It should be noted that the transfer of the location information may be initiated in different ways including, but not limited to:

1. Radio button press initiated by radio user
2. Dispatch data message
3. Local interface data messages
4. Radio returns to a system after its been out of range Thus, various embodiments of the invention allow a user to be tracked in a normal, low bandwidth mode, while allowing the system to interrogate the radio unit and retrieve a detailed tracklog if needed or for such operation to be initiated by an event or user action. In this mode the radio unit still can transmit position updates at a pre-configured slow rate, but if a specific event occurs the radio will change the sample rate and acquire the position data, namely the location information at a higher rate (initiating an emergency tracking mode). The radio unit internally stores the data for retrieval at a later time when the system is not heavily loaded or when the radio unit is offline. The radio unit also may function (in certain modes) in a standalone manner without any need to interact with a data system in normal operation. For example, if a triggering event occurs, then the location information can be manually recovered from the radio. The detailed tracklogs generally include more information than the periodic position update messages. For example, the periodic update messages only provide updates generated over longer intervals (e.g., not as many updates over a certain period of time) and that may only include location information. The information in the detailed tracklogs is generated more frequently and may include not only location information, but radio operation information. For example, the additional information or parameters may include information or parameters such as speed and direction that are not normally transmitted. Additionally, the tracklog can store a location to mark where a specific event occurred. Typical events may be a PTT, an emergency declaration, or a waypoint associated with a particular button on the radio. Further, the location information continues to be acquired and stored while a radio unit is out of range of the radio system. When the radio unit re-enters the system, the system can request a tracklog.

Accordingly, non-volatile local storage of a database of position and time/position stamped events allows for both remote and local retrieval of this database. Additional infrastructure to support data operations are not needed. The radio units can operate normally and the logs can be retrieved manually later or during non-busy communication times.

The various embodiments and/or components, for example, the radio units or controllers therein, or the system or controllers therein, may be implemented as part of one or more computer systems. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or component to the teachings of the invention without departing from its scope. While the configurations and types of components described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method for communicating location information for a radio unit, the method comprising:

placing said radio unit in a first tracking mode;
in response to the placement of said radio unit in said first tracking mode, performing by the radio unit the following operations comprising
acquiring first location information at a first sample rate, and
automatically and periodically transmitting said first location information from the radio unit to an external device based on a first transmission rate;
detecting a depression of a PTT button by a user of said radio unit;
transitioning said radio unit from said first tracking mode to a second tracking mode in response to said detection of said depression of said PTT button; and
in response to the transition to the said second tracking mode, performing by the radio unit the following operations comprising
acquiring second location information at a second sample rate that is different from said first sample rate,
storing said second location information in a data store of the radio unit based on said second sample rate, and
retrieving said second location information from said data store exclusively upon request from a user of said radio unit or said external device.

2. A method in accordance with claim 1 wherein the second sample rate is higher than the first sample rate.

3. A method in accordance with claim 1 further comprising transmitting the second location information as a single data packet over a radio-frequency (RF) communication link.

4. A method in accordance with claim 1 further comprising transmitting the second location information as a single data call via a radio-frequency (RF) communication link when voice calls on the RF communication link are below a predetermined level.

5. A method in accordance with claim 1 further comprising transferring the second location information via a wired connection when the radio unit is offline.

6. A method in accordance with claim 1 wherein storing the second location information comprises maintaining the second location information in a non-volatile memory of the radio unit.

7. A method in accordance with claim 1 further comprising encrypting the second location information.

8. A method in accordance with claim 1 further comprising allowing access to the second location information only with a password.

9. A method in accordance with claim 1 further comprising storing corresponding radio operation information in connection with the second location information to define tracking information, wherein the radio operation information includes at least one of a time stamp, a speed of the radio unit and a direction heading for the radio unit.

10. A method in accordance with claim 1 wherein storing the second location information comprises storing the second location information on a removable memory media of the radio unit.

11. A method in accordance with claim 1 further comprising transmitting the second location information in a compressed format.

12. A method in accordance with claim 1 wherein the second location information comprises a tracklog having a collection of data points defined by individual location waypoints and radio events.

13. A method in accordance with claim 1 further comprising transmitting the second location information using a public safety frequency band.

14. A method in accordance with claim 1 further comprising transmitting the second location information to a dispatch unit and storing the second location information in a database.

15. A method for tracking a radio unit, the method comprising:
placing said radio unit in a first tracking mode;
in response to the placement of said radio unit in said first tracking mode, performing by the radio unit the following operations comprising
acquiring first location information for the radio unit at a first sample rate,
automatically and periodically transmitting the first location information from the radio unit to an external device in accordance with a first transmission rate;
detecting a depression of a PTT button by a user of said radio unit;
transitioning said radio unit from said first tracking mode to a second tracking mode in response to said detection of said depression of said PTT button;
in response to the transition to said second tracking mode, performing by said radio unit the following operations comprising
acquiring second location information for the radio unit at a second sample rate that is different from said first sample rate,
storing the second location information in a data store of the radio unit, and
transmitting the second location information from said radio unit to said external device exclusively upon request from a user of said radio unit or said external device.

16. A method in accordance with claim 15 further comprising transmitting the second location information via a wireless connection when a bandwidth load of wireless connection is below a predetermined level.

17. A method in accordance with claim 15 further comprising encrypting the second location information and providing access to the second location information only upon verifying a security password.

18. A method in accordance with claim 15 further comprising storing radio operation information in connection with the second location information to form a time based tracklog defining tracking information.

19. A radio unit comprising:
at least one circuit configured to:
acquire first location information at a first sample rate when said radio unit is in a first tracking mode;
automatically and periodically transmit said first location information based on a first transmission rate when said radio unit is in said first tracking mode;
detect a depression of a PTT button by a user of said radio unit;
transition said radio unit from said first tracking mode to a second tracking mode in response to said detection of said depression of said PTT button;
acquire second location information at a second sample rate when said radio unit is in a second tracking mode, said second sample rate being different than said first sample rate;
store, in a data store of said radio unit, said second location information in connection with radio operation information when said radio unit is in said second tracking mode, the radio operation information including one of a timestamp, a speed indication and a direction indication; and retrieving said second location information from said data store exclusively upon request from a user of said radio unit or said external device.

20. A method for communicating location information for a radio unit, the method comprising:
placing said radio unit in a first tracking mode;
in response to the placement of said radio unit in said first tracking mode, performing by the radio unit the following operations comprising
acquiring first location information at a first sample rate, and
automatically and periodically transmitting said first location information from the radio unit to an external device based on a first transmission rate;
detecting a failure by said radio unit to respond to voice requests;
transitioning said radio unit from said first tracking mode to a second tracking mode in response to said detection of said failure; and
in response to the transition to the said second tracking mode, performing by the radio unit the following operations comprising
acquiring second location information at a second sample rate that is different from said first sample rate,
storing said second location information in a data store of the radio unit based on said second sample rate, and
retrieving said second location information from said data store exclusively upon request from a user of said radio unit or said external device.

* * * * *